US009826760B2

(12) United States Patent
Ding et al.

(10) Patent No.: US 9,826,760 B2
(45) Date of Patent: *Nov. 28, 2017

(54) COLLAGEN FIBER RECONSTITUTED RAWHIDE AND PROCESS FOR MAKING

(71) Applicant: WENZHOU PEIDI PET PRODUCTS CO., LTD., Wenzhou (CN)

(72) Inventors: Zhi Wen Ding, Beijing (CN); Zhen Biao Chen, Shanghai (CN); Zhen Lu Chen, Shanghai (CN)

(73) Assignee: WENZHOU PEIDI PET PRODUCTS CO., LTD., Wenzhou, Zhejiang Province (CN)

( * ) Notice: Subject to any disclaimer, the term of this patent is extended or adjusted under 35 U.S.C. 154(b) by 191 days.

This patent is subject to a terminal disclaimer.

(21) Appl. No.: 14/679,443

(22) Filed: Apr. 6, 2015

(65) Prior Publication Data

US 2015/0208695 A1 Jul. 30, 2015

Related U.S. Application Data

(63) Continuation of application No. 13/185,499, filed on Jul. 18, 2011, now Pat. No. 9,016,241.

(51) Int. Cl.
*A01K 29/00* (2006.01)
*A23K 1/18* (2006.01)
(Continued)

(52) U.S. Cl.
CPC .............. *A23K 1/18* (2013.01); *A01K 15/025* (2013.01); *A23K 10/26* (2016.05); *A23K 50/00* (2016.05); *A23K 50/42* (2016.05)

(58) Field of Classification Search
CPC .. A01K 15/025; A01K 15/026; A23K 1/1846; A23K 1/1853
(Continued)

(56) References Cited

U.S. PATENT DOCUMENTS 3,198,173 A * 8/1965 Fisher .................. A01K 15/026
119/709
3,619,200 A * 11/1971 Ferguson ............... A23K 50/10
424/438

(Continued)

*Primary Examiner* — David Parsley
(74) *Attorney, Agent, or Firm* — Seth M Reiss, AAL, ALLLC (57) ABSTRACT

This invention describes a collagen fiber reconstituted rawhide useful in the production of pet chews, and a method for making the same. Beginning materials include animal skins with hair, depilated limed splits and leftovers from the manufacture of rawhide pet chews. The materials are pretreated, ground, subjected to acid treatment to swell and separate the collagen fibers that comprise the animal hide, further ground into pulp, vacuum filtered, mixed with a dehydration agent that chemically shrinks the expanded fibers, drained, formed and dried into sheet and/or exposed to a cross-linking agent to increase the adhesive strength of the end product. Edible materials, including meats, may be added to the solution prior to draining, to enhance the nutritional value and palatability of the final product, and the reconstituted rawhide sheets may be bleached for appearance. The described method produces rawhide pet chews at lower cost, and of greater diversity and utility, compared with current methods of production.

18 Claims, 5 Drawing Sheets

(51) Int. Cl.
  *A01K 15/02* (2006.01)
  *A23K 10/26* (2016.01)
  *A23K 50/00* (2016.01)
  *A23K 50/42* (2016.01)

(58) Field of Classification Search
  USPC .... 119/702, 707, 709, 710, 711; 426/55, 59, 426/641, 646
  See application file for complete search history.

(56) References Cited

U.S. PATENT DOCUMENTS

| | | | | |
|---|---|---|---|---|
| 3,782,977 | A * | 1/1974 | Henderson et al. | A22C 13/0016 264/209.1 |
| 4,366,176 | A * | 12/1982 | Wetzel | A23C 20/025 210/321.6 |
| 6,799,536 | B1 * | 10/2004 | Jia | A23K 50/40 119/709 |
| 6,840,196 | B2 * | 1/2005 | Kirch | A01K 15/026 119/709 |
| 6,935,275 | B2 * | 8/2005 | Jia | A01K 15/026 119/710 |
| 7,013,838 | B2 * | 3/2006 | Hague | A01K 15/026 119/315 |
| 7,147,888 | B2 * | 12/2006 | Brown | A23K 40/30 119/710 |
| 7,194,981 | B2 * | 3/2007 | Kirch | A01K 15/026 119/710 |
| 7,691,426 | B2 * | 4/2010 | Axelrod | A01K 15/026 119/710 |
| 7,790,212 | B2 * | 9/2010 | Chong | A01K 15/026 119/710 |
| 7,921,814 | B1 * | 4/2011 | Tsengas | A23K 20/174 119/710 |
| 8,074,609 | B2 * | 12/2011 | Adkins | A01K 15/026 119/707 |
| 8,215,267 | B2 * | 7/2012 | Axelrod | A01K 15/026 119/709 |
| 9,016,241 | B2 * | 4/2015 | Ding | A01K 15/025 119/709 |

* cited by examiner

Microscopic View of Collagen Fibers in Natural Rawhide

FIG. 3A

Microscopic View of Collagen Fibers in Reconstituted Rawhide

COLLAGEN FIBER RECONSTITUTED RAWHIDE AND PROCESS FOR MAKING

CROSS-REFERENCE

This U.S. patent application is a continuation of earlier filed nonprovisoinal U.S. application Ser. No. 13/185,499 entitled "Collagen Fiber Reconstituted Rawhide and Process for Making" filed Jul. 18, 2011, now U.S. patent Ser. No. 14/679,443. This application claims the benefit of domestic priority, pursuant to 35 U.S.C. 120, of said earlier filed nonprovisional application. The earlier filed application claims the benefit of foreign priority, pursuant to 35 U.S.C. 119 and 37 CFR 1.55, of Chinese National Patent Application Number 201010273607.9 filed 2 Sep. 2010. Both earlier filed applications are incorporated in their entireties here by this reference.

BACKGROUND OF THE INVENTION

Technical Field

This invention relates to the area of animal nutrition and pet chews. More specifically, this invention concerns the use of reconstituted rawhide for animal nutrition and pet chews and a method for making the same.

Background Art

Rawhide is a primary material for dog chews and is generally made of animal skin, which may be further processed. The material is then dried and cut to size, then rolled, knotted or twisted into a pet chew. Generally, the rawhide material comes from a hide 'split'; a lower or inner layer of the skin's flesh side that is split away from the upper, or grain layer typically used in leather products. Material for dog chews is generally taken from a lower split that has little remaining commercial value for use in leather products.

Processing animal hide for leather and rawhide products begins with soaking, depilation (called 'liming' if lime is included in the process), unhairing, then splitting the hide into layers which are de-limed with acid and bated (to improve suppleness) to result in a pelt ready for tanning. Tanning produces a flexible, more stable form of leather that is less likely to putrefy; whereas rawhide forms inflexible material that becomes putrid when re-wetted. The initially processed animal hide, whether used for higher-value leather grained products, or as rawhide, is referred to as 'limed animal hide'.

Limed animal hide is generally used in a variety of products, including collagen fiber. Incorporating collagen fiber from rawhide, or combining collagen fiber with rawhide, is well known in the art. Also well known in the art are pet chews made from collagen fiber with or without rawhide that is cut, knotted, molded and/or extruded into various shapes and used by dogs to fulfill their natural chewing behavior.

The commercial production of dog chews from limed animal hide includes the steps of:
- Washing: repeated washing with water removes sulfide and lime impurities from the limed animal hide;
- Deliming and bating: weak acid materials neutralize lime bound to the limed animal hide; enzymes can be used to further soften and bate the skin fiber structure;
- Further washing: repeated washing with water to remove impurities produced in deliming and bating processes;
- Swelling with acid or bleach: the specific bleaching agent is determined based on the desired product. To produce rawhide with a natural color, acid can be used to swell the skin and bleach it. After drying, the rawhide will have a transparent appearance. For production of white rawhide, hydrogen peroxide can be used to result in a bleached, white rawhide. Food color can be added to obtain colored rawhide.
- Drying: dog chews formed from shaped rawhide are then dried.

Shaping rawhide chews result in off-cuts and scraps of the rawhide material which are unusable due to uneven thickness, irregular shape, or odd size. These off-cuts and scraps are sold for a lower price than the intact rawhide split. Known techniques to re-process the rawhide scraps for use in pet chews include:
- Grinding the rawhide scraps into granules which can then be mixed with gelatin and other edible adhesives. This mixture is then molded by extrusion or injection to form various shapes, or extruded into flat sheets which can be then processed into other shapes such as knotted bones. Disadvantages to this method of re-processing rawhide scraps are two-fold: First, the particles obtained by grinding provide no adhesive properties requiring the addition of gelatin or other adhesive; Second, gelatin, as an adhesive, is hard and brittle after being dried and is therefore difficult to bend and knot into the popular chew shapes.
- Producing collagen casings to prepare bonded rawhide. Rawhide scrap pieces are swelled, then gelatinized by mechanical force and extruded or injected into shapes. Disadvantages to this method are again two-fold: First, skin fibers remain expansive when combined with large amounts of water and are therefore difficult to dehydrate. For this reason, material prepared by this method is usually used in the production of thinner products, such as casings made by extrusion molding. Thicker extruded products (such as shaped chews) are difficult to dry, which can lead to high moisture content and a tendency to deteriorate. The second disadvantage is that the resultant product demonstrates a flaky consistency having the tendency to break off during bending and knotting, requiring its use in a shape other than a knotted bone.

Rawhide dog chews are generally of poor palatability and nutritional value, resulting in the trend of incorporating meat products and infused flavors into the rawhide dog chews. These additional steps increase operational costs for producing the chews. Additionally, a weak bond between the additives and the rawhide limits the application for dog chews.

BRIEF SUMMARY OF INVENTION

To overcome disadvantages of prior art collagen fiber pet chews, the present invention utilizes a novel method to create a collagen fiber reconstituted rawhide of consistent thickness, with bonding properties that can incorporate meat fiber, flavor, and/or health additives without utilizing adhesive materials.

According to the method of the present invention remanufacturing materials including scraps and off-cast products from limed animal hide are further treated by acid swelling, defibering and grinding, filtration and other steps, to form a collagen fiber suspension. The suspension is then vacuum filtered for consistent particle size, and chemically dehydrated; the resulting slurry is drained through a screen, laid into a form and pressed, then dried. Once dry, a cross-linking agent is added to produce a collagen fiber reconstituted rawhide.

The collagen fiber slurry can be mixed with edible materials, such as meat fiber and other nutrition and palatability enhancers, as well as additives to promote specific health conditions, such as hip and joint health and immune system support, to name a few. The added meat fibers, flavors, and/or additives are thereby bonded into the collagen fiber reconstituted rawhide. This method produces a mechanically strong pet chew material with good nutrition value and flavor, and of controllable shape, size and thickness utilizing what might otherwise be waste material.

DETAILED DESCRIPTION OF THE INVENTION

Figure 1:
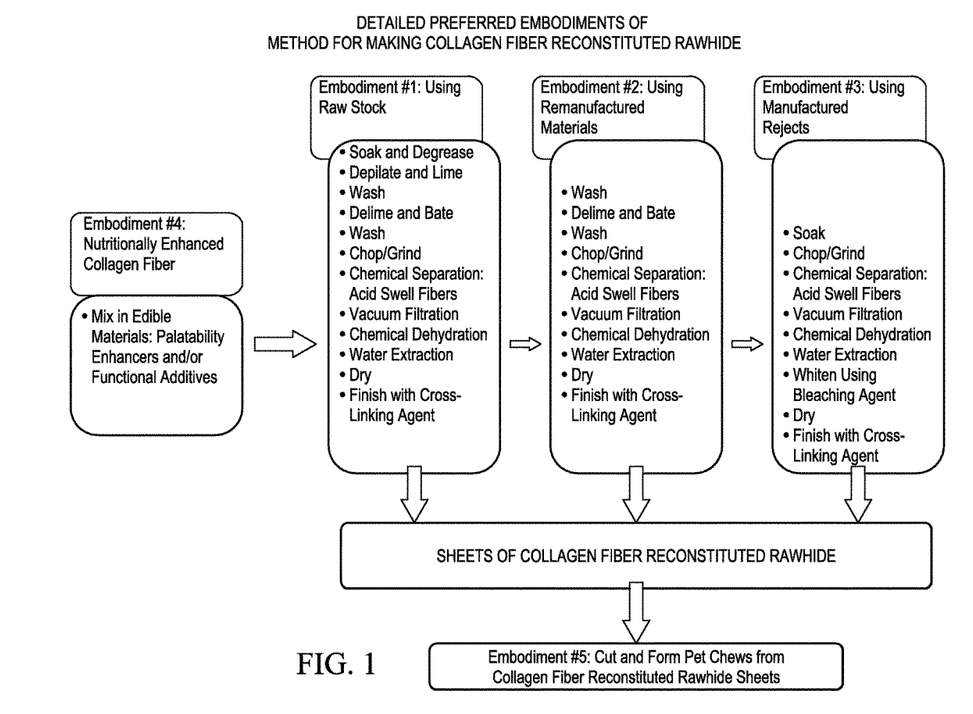
FIG. 1 shows flow charts illustrating alternative preferred embodiments of the novel method of claimed invention.

One aspect of the invention relates to creation of a specific collagen fiber structure though the preparation method illustrated in the flowcharts of FIG. 1, characterized by the steps of:

1. Adjusting the pH value of the limed animal hide to <5 by the addition of acidic material and allowing the collagen fibers in the limed animal hide sufficient time to swell. According to one preferred embodiment of the invention, the pH value of the limed animal hide swelling solution is adjusted to <3;
2. Defibering and grinding the limed animal hide with the pH adjusted as per step 1 above to produce a collagen fiber suspension;
3. Optionally, filtering and removing un-dissolved skin fibers from the collagen fiber suspension;
4. Dehydrating the collagen fiber suspension to contract the expansive state of the collagen fibers;
5. Draining the collagen fiber suspension produced in step 4 above, placing the remaining slurry in a form, and mechanically removing water by draining, pressing and drying the collagen fiber reconstituted rawhide.
6. Applying a cross-linking agent to the formed and dried collagen fiber reconstituted rawhide to tighten the fiber bonds and finish the reconstituted rawhide;
7. Optionally, lightening the color of the collagen fiber reconstituted rawhide with a bleaching agent for white appearing collagen fiber reconstituted rawhide.

Dehydration of the collagen fibers from the suspension described in step 4 above can be achieved by adding an appropriate amount of neutral salt and/or alkaline substance functioning as a dehydration agent, or by using any of the other known collagen fiber dehydration methods. When adding a neutral salt, the quantity should adjust the salinity of the collagen fiber suspension (proportion by weight) to ≥3%, and preferably to ≥5%; when adding an alkaline substance, the quantity should adjust the pH value of the collagen fiber suspension to 6-8, preferably to 6.0-6.8, and more preferably to 6.2-6.4.

Mixing edible materials into the collagen fiber suspension can be included between steps 4 and 5 above, so as to improve nutritional value and flavor of the collagen fiber regenerated rawhide.

The non-dissolved skin fibers described in step 3 above refer to fibers having a diameter ≥1 mm.

According to the method of the subject invention, the initial raw material can be raw stock, remanufactured materials, and/or manufactured rejects. Raw stock refers to animal skins that have not been treated by depilation and need to be depilated during pretreatment; remanufactured materials are depilated limed animal hide obtained after processes of soaking, depilation and liming during rawhide production. Manufactured rejects include irregular shapes of scrap materials leftover from formation of dog chews insufficient to create a complete chew, and defective, imperfect, or off-grade dog chews. The animal skins can be from calf, pig, sheep or horse, and also can be of any of the following rawhides: the full thickness rawhide, the top layer skin, the split rawhide or the third layer of the skin.

The method of the subject invention encompasses the application of known methods of rawhide pretreatment. For example, pretreatment of raw stock includes depilating, liming, degreasing, deliming, washing and grinding; pretreatment of remanufactured material includes degreasing, deliming, washing and grinding. Pretreatment of manufactured rejects includes soaking and grinding.

According to the method of the present invention, edible materials that may be mixed into the collagen fiber solution between steps 4 and 5 above include meat and/or nutritional food quality materials; and the meat refers to that of fibroid and/or granular shapes from all edible animal meat, such as chicken, duck, goose, pork, beef, mutton, fish, etc. The nutritional food quality materials refer to raw materials that can increase the nutrient component or can improve the taste and flavor of the food, such as chicken powder, seasoning, oils, soy sauce, vinegar and other palatability enhancers, and functional additives such as vitamins, minerals glucosamine, chondroitin sulfate, omega fatty acids, or antioxidants.

Another aspect of this invention relates to a collagen fiber reconstituted rawhide prepared by the novel methods of the subject invention.

Another aspect of this invention relates to pet products, specifically dog chews, which are produced from the collagen fiber reconstituted rawhide prepared by the novel method of this invention. For example, the collagen fiber reconstituted rawhide prepared by the method of the present invention can be formed into various pet chew shapes through cutting, re-bating, knotting or other technique to create various shapes of products for pet dogs to play with, bite, and chew. According to a preferred embodiment of this invention, the collagen fiber reconstituted rawhide can be cut into various sized rectangles, and made into dog chews of bone-like shapes, such as knotted bones.

Bating refers to the use of bate, a substance often made from fermented animal dung, used to remove hair and the other outer protein layer from the hide in the tannery process.

According to the method of the present invention, the bleaching agent when used can be chlorine bleach agent or an oxygen bleach agent such as hydrogen peroxide, hypochlorite, etc.; in a preferred embodiment, the bleaching agent used is a solution of hydrogen peroxide. The purpose of bleaching in the method of the present invention is to create collagen fiber reconstituted rawhide products having a white appearance.

The acid material used in the method of the invention can be inorganic acid or organic acid, or the acid salts thereof including, for example, formic acid, acetic acid, sulfuric acid, hydrochloric acid, nitric acid, lactic acid, etc. According to a preferred embodiment of the method in the subject invention, the acid material used is formic acid. Formic acid was found through study and experimentation to function more efficiently over other acids in production of reconstituted rawhide products.

The neutral salt used in the dehydration process of step 4 above can be sodium sulfate, sodium chloride, calcium chloride or potassium sulfate, etc. According to a preferred embodiment of the method in the subject invention, the neutral salt used is sodium sulfate.

The alkaline substance used in the dehydration process of step 4 above can be organic based or inorganic based, such as sodium hydroxide, calcium hydroxide, sodium carbonate, sodium bicarbonate, magnesium hydroxide, etc; According to a preferred embodiment of the method in the subject invention, the alkaline substance used is sodium hydroxide.

A cross-link agent refers to aldehydes that are added after the rawhide is formed and dried, and act to tighten the fiber bonds on the rawhide surface so that the reconstituted rawhide does not flake and become soft or fuzzy. The cross-linking agent used in step 6 above can be formaldehyde, glutaraldehyde, aluminum, etc. According to a preferred embodiment of the method in the subject invention, the cross-linking agent refers to formaldehyde.

According to the method of this invention, the raw material that has undergone primary defibering is treated with acid to expand and weaken the fiber bonding forces, then undergoes further mechanical separation by grinding or blending with water to obtain a more disperse collagen fiber solution.

Figure 2A:
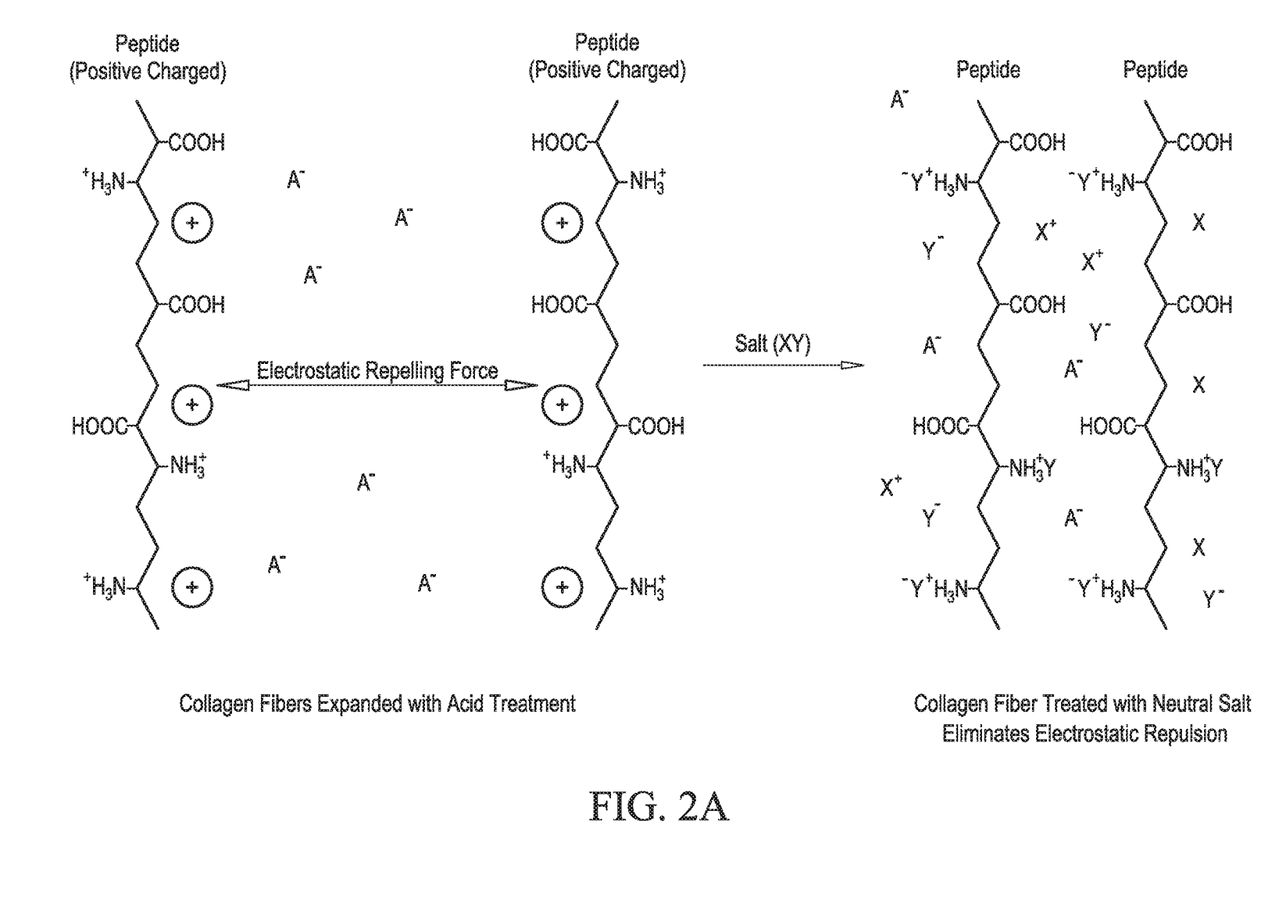
FIGS. 2A and 2B are chemical diagrams showing the manner in which the carboxyl ions on the collagen fibers are neutralized by addition of a neutral salt or alkaline dehydration agent.
Figure 2B:
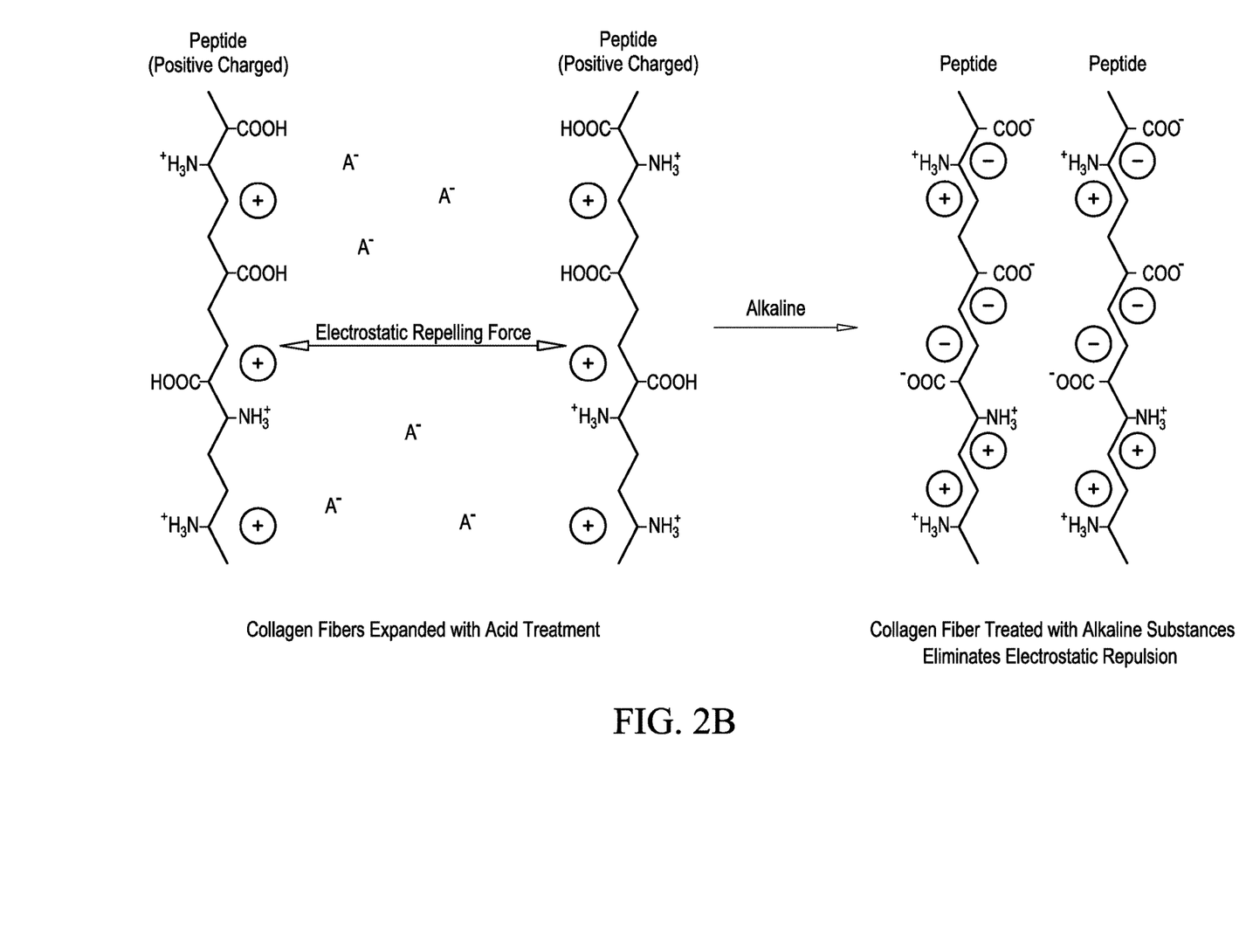

Also according to the method of the present invention, neutral salts or alkaline solutions are used as dehydration agents to contract the collagen fibers. As illustrated in FIGS. 2A and 2B, dehydration agents refer to alkaline substances and neutral salts that deactivate the electrolytic charges found on the ionized carboxyl groups in the collagen fiber solution, allowing the release and removal of the water molecules. This improves the drying rate of the fibers substantially. Rapid water drainage and pressing the slurry between rollers further removes water from the solution, promoting formation of the collagen fiber reconstituted rawhide.

Using the novel method of the subject invention, a thicker collagen fiber reconstituted rawhide can be created with reduced drying cost. In other forms of rawhide chew production incorporating collagen, the collagen fibers maintain their expanded state once acid swelled, holding water to the fibers and impeding dehydration of the material, leading to a low drying rate and higher cost. These saturated materials are also unable to produce thicker collagen fiber bonded rawhide.

Collagen fibers are amphoteric structures, the active groups on which mainly comprise collagen amino and carboxyl. In the acidic condition as illustrated in FIGS. 2A and 2B, the collagen carboxyl is closed and the collagen fibers exhibit positive charges of the collagen amino. The electrostatic repulsion between the positive charges result in expansion and water absorption of the fibers, and the expanded state of the fibers makes it difficult to dehydrate the material.

According to the method of the invention, a neutral salt of a concentration sufficient to adjust the salt weight concentration of the dehydration agent to >5% should be used after the steps of acid swelling, defibering, grinding, and filtration. Treating the collagen fiber solution in an acid expanded state will close the electric charges on the collagen fiber and eliminate the electrostatic repulsion as illustrated in FIG. 2A, weakening the binding force between water and collagen fibers and facilitating the removal of water. Once so treated, the water easily drains off when the material is laid in a screen and further drains with the application of mechanical pressures from, for example, of vacuum filtration and rollers.

Alkaline substances can also be used to promote dehydration of the collagen fiber suspension in an acid expanded state. The addition of alkaline substances ionizes the collagen carboxyl on the collagen fibers, demonstrating negative charges, thereby creating equal numbers of positive and negative charges on the collagen fibers which cancel one another out, and result in the elimination of the electrostatic repulsion as illustrated in FIG. 2B. Through experimentation, it has been determined that the pH value should be between 6.0 and 6.8, and preferably between 6.2 and 6.4. Under such conditions, the collagen fibers can be dehydrated, as the weakened binding force between the water and collagen fibers allows the water to be released when material is poured in a forming screen and pressure applied. However, dehydration methods can be affected by the raw materials, so that use of alkaline substances may produce less efficient results compared to that of neutral salts.

Alternatively, the application of neutral salts and alkaline materials concurrently in processing of the collagen fiber solution can eliminate swelling and improve dehydration, releasing water from the collagen fibers and promoting water release when material is poured in a forming screen and pressure applied.

Figure 3A:
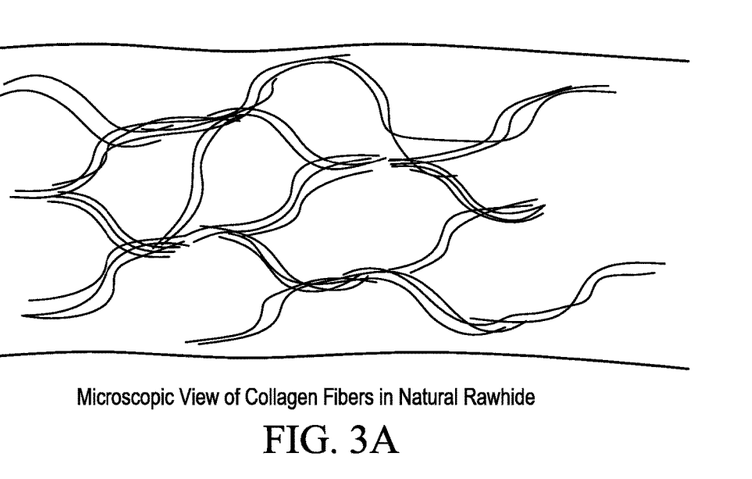
FIGS. 3A and 3B show, in microscopic view in cross-section, collagen fibers in natural rawhide as compared with collagen fibers in the reconstituted rawhide produced according to the method of the claimed invention.
Figure 3B:
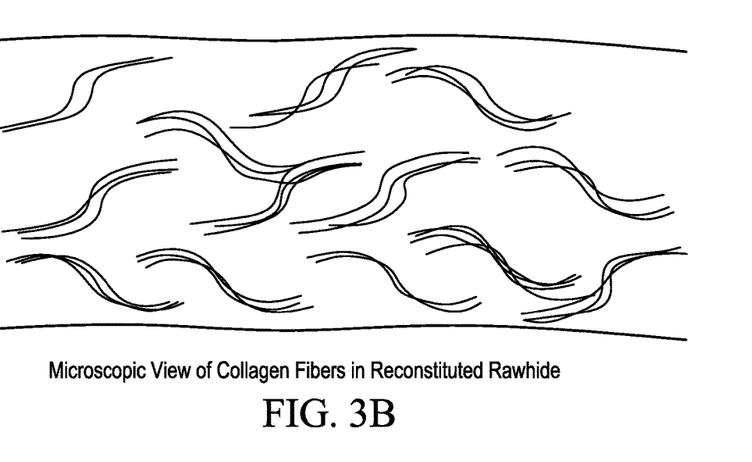

In the present invention, the collagen fiber reconstituted rawhide is processed using a cross-linking agent after being formed and dried. Illustrated in FIGS. 3A and 3B, in microscopic view and cross-section, are collagen fibers as seen in natural rawhide (FIG. 3A) compared with the same fibers as seen in the reconstituted rawhide produced according to the method of the present invention (FIG. 3B). Cross-linking stabilizes collagen fibers within the reconstituted rawhide and tightens the fiber bonds on the rawhide surface so that it does not flake and become soft or fuzzy when placed in water. This enables the collagen fiber reconstituted rawhide to be soaked, re-bated, and knotted, as well as whitened, to produce high-end pet chew products. Reconstituted rawhide not treated with a cross-linking agent will swell and become unusable during strong bleach treatment. Methods for treating reconstituted rawhide using a cross-linking agent include soaking or spraying the reconstituted rawhide with the cross-linking agent, or by other known methods. According to a preferred embodiment of present invention, the collagen fiber reconstituted rawhide is soaked with the cross-linking agent.

According to the method of the present invention, the cross-linking agent is not added to the collagen fiber solution before the solution is formed and dried, rather the dried collagen fiber reconstituted rawhide earlier prepared is stabilized and strengthened through the application of a cross-linking agent in order to obtain bonded rawhide with a smooth surface and strong bonding forces between the fibers. If the cross-linking agent is added to the collagen fiber solution before forming and drying, the collagen fiber reconstituted rawhide will have a rough surface due and weak bond between the collagen fibers.

According to the method of the present invention, the adhesive forces of the collagen fibers themselves are utilized for polymerization, as opposed to adding adhesive materials during preparation of reconstituted rawhide, resulting in reconstituted rawhide having stronger mechanical strength and better flexibility.

According to a preferred embodiment, the method of preparing collagen fiber reconstituted rawhide in the present invention includes pretreatment, acid swelling, defibering and grinding, filtering particles, dehydration, draining, drying, cross-linking, etc. of the rawhide, specifically according to the following:

1. Pretreatment of the rawhide: Pre-treat as appropriate for the raw materials according to known methods and techniques;
2. Acid swelling: Adjust the pH value of the pretreated rawhide solution using formic acid to less than 3.0 to sufficiently swell the rawhide fibers;
3. Defibering and grinding: Grind the rawhide after acid swelling treatment. Then further pulverize the swollen rawhide using a high speed grinding machine to create a collagen fiber suspension;
4. Filtering: Filter the collagen fiber suspension to remove grains larger than 1 mm;
5. Dehydrating: Introduce a neutral salt and alkaline material into the suspension to make the salt concentration of the solution greater than 5% by weight, with a pH value ranging from 6.2 to 6.4. Dehydrate the collagen fiber suspension to contract the expansive state of the collagen fibers;
6. Water filtrating by filter screen: Lay the collagen fiber slurry after dehydration flat on a form fabricated from screen material to drain the water from the collagen fibers. Next apply mechanical pressure, such pressing between rollers;
7. Drying and cross-linking: Dry the formed fiber material and then immerse the formed material into the cross-linking agent. Then dry again to produce collagen fiber reconstituted rawhide;
8. Optionally, bleach the collagen fiber reconstituted rawhide with a bleaching agent for a collagen fiber reconstituted rawhide exhibiting a whitened appearance.

Figure 4A:
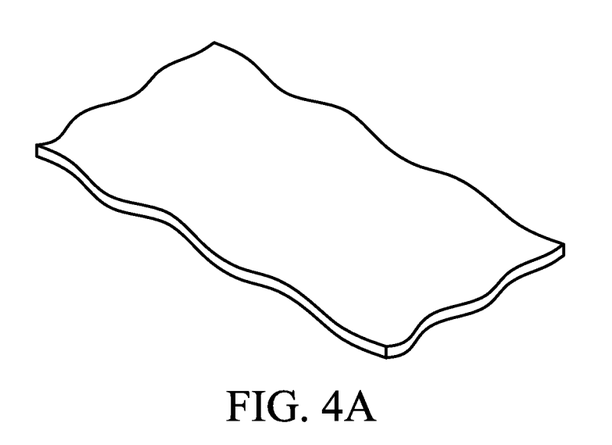
FIGS. 4A and 4B show sheets of reconstituted rawhide produced according to the method of the claimed invention with and without edible material added.

FIG. 4A shows a sheet of reconstituted rawhide produced according to the method of the present invention without meat bits added.

According to an alternative preferred embodiment of the invention, the preparation method of the collagen fiber reconstituted rawhide includes the specific following processes:

1. Pretreatment of the rawhide: Pre-treat as appropriate for the raw materials according to known methods and techniques;
2. Acid swelling: Adjust the pH value of the pretreated rawhide solution using formic acid to less than 3.0 to sufficiently swell the raw hide fibers;
3. Grind the rawhide after acid swelling treatment. Then further pulverize the swollen rawhide using a high speed grinding machine to create a collagen fiber suspension;
4. Filtering: Filter the collagen fiber suspension to remove grains greater than 1 mm;
5. Dehydrating: Introduce a neutral salt and alkaline material into the suspension to make the salt concentration higher than 5% by weight, with a pH value of ranging from 6.2 to 6.4. Dehydrate the collagen fiber suspension to contract the expansive state of the collagen fibers;
6. Mixing: Mix the collagen fiber solution with other edible raw materials to create a composite solution;
7. Water filtrating by filter screen: Lay the collagen fiber slurry after dehydration flatly on a form fabricated from screen material to drain the water from the collagen fiber. Next apply mechanical pressure, such as pressing between rollers;
8. Drying and cross-linking: Dry the formed fiber material and then immerse the formed material into the cross-linking agent. Then dry again to produce composite collagen fiber reconstituted rawhide;
9. Optionally, bleach the composite collagen fiber reconstituted rawhide with a bleaching agent for composite collagen fiber reconstituted rawhide exhibiting a white appearance.

Figure 4B:
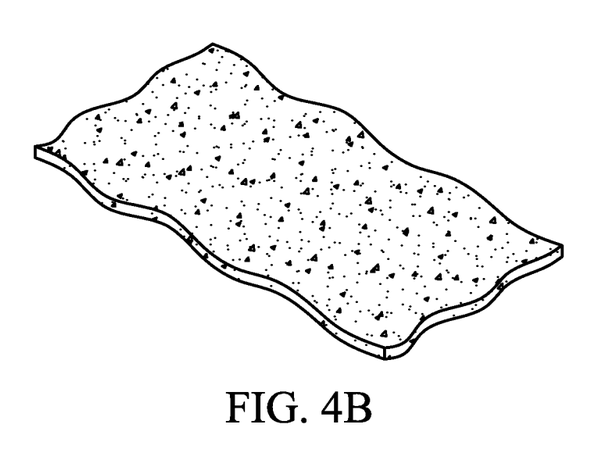

FIG. 4B shows a sheet of reconstituted rawhide produced according to the method of the present invention with meat bits added, illustrating the manner in which edible raw material can be fully integrated within collagen fiber reconstituted sheet.

Although the edible raw materials are described above as being added after the addition of a dehydration agent and prior to screen filtration and draining, edible raw materials may alternatively be added at the same time as the dehydration agent, or prior to the addition of the dehydration agent, this alternative process giving rise to a composite collagen fiber reconstituted rawhide end product exhibiting somewhat different physical properties.

Collagen fiber reconstituted rawhide prepared according to the novel method of the present invention, specifically including the successful dehydration a collagen fiber solution, provides the following advantages among others:

a) Wider selection of raw materials: Besides animal skins, pieces of depilated lime animal hide, scraps from cuttings from other processes, manufacturing reject material including from the production of pet chews, can all be utilized in the production of reconstituted rawhide according to the method of the subject invention;

b) Better control of the thickness and size of the collagen fiber reconstituted rawhide: The thickness and size of the collagen fiber reconstituted rawhide are controllable by adjusting the parameters of the process and equipment used to meet different requirements, including improved utilization rate of rejected pet chew products.

c) No adhesive added: No adhesive agent is utilized or required in the collagen fiber reconstituted rawhide. Instead, the adhesive force of the collagen fiber itself is achieved through use of neutral salt and/or alkaline sizing agent that allows dehydration of fibers, providing better mechanical strength and flexibility to the reconstituted final product;

d) Low production cost: Due to the low cost basis of the scrap raw material, reconstituted sheet rawhide can be produced at a fraction of the natural hide production cost. Additional savings through the hide utilization, cutting and sorting processes outlined in advantage b) above are also obtained. In addition the mechanization and standardization of the process that produces sheet rawhide of standard width, thickness and length further lends itself to mechanization of the bone knotting process that has not previously been feasible due to the variations in sheet thickness and dry weights of natural rawhide.

e) Convenient combination with other edible raw materials: New types of pet chews can be generated by mixing the collagen fiber slurry with meat and/or other nutritional additives. The collagen fiber bonds other meat products or small meat pieces utilizing the chemical adhesive forces of the collagen fiber providing improved pet chews having advantages such as improved nutrition and good taste. Many new innovations in dog chews have involved adding sheets of meat jerky or other oily animal skins such as pork-hide to rawhide to improve overall palatability. Both additions add complexity to the bone tying process, hence labor time and cost. In the case of adding meat jerky to the rawhide, the meat is relatively expensive, so only thin strips of meat are added and only along the exposed seams of the knotted bones so that the dog can identify the meat and use it as a starting point to chew. However, many dogs have become adept at removing the meat from the rawhide without chewing the rawhide as intended, rendering the rawhide dog chew unappealing to chew once the meat is removed. According to the method of the present invention, the meat in incorporated and locked into the rawhide fiber, the dog is aware of its existence and has no alternative but to chew the rawhide to release the meat treat. Additionally, as explained in advantage d) above, the complexity of adding a second sheet to a dog chew has also made it difficult to mechanize the bone knotting process for these dual sheet embodiments. The process of the claimed invention overcomes this obstacle.

When compared to the process of making pet chews from natural rawhide, the method of the present invention provides greater efficiency in the utilization of hide materials and greater flexibility in the size and shape of manufactured products, leading to lower operating costs, better conservation of resources, and greater profit potential.

The natural hides from a cow are thicker and thinner on different parts of the cows' body. When cow hides are removed they are often ripped or there are holes in them and the perimeter of the removed hide demonstrates a very irregular shape. Much time, effort and labor cost is invested into the rendering of the dried hide into the most efficient use. Rawhide of a certain thickness is too thick to be knotted into small pet chews while rawhide that is too thin cannot be used to make large pet chew bones. So a single sheet of removed rawhide needs to be dissected into various sized rectangles sizes according to size and thickness so as to maximize the use of the clear hide and minimize the overall waste around the edges and the holes and tears in the hide. This all has to take place in the context of the order fulfillment and requires an ongoing assumption of a good mix of large bones and small bone orders to fulfill. Quite often factories receive lopsided orders for one size of pet chew bone, while only 20-30% of any hide can be utilized for making small bones, leading to the stockpiling of the thicker part of the hide until it can be used for future orders of large pet chew bones. Very few producers can afford to do this. This sorting process also adds a lot of labor costs, making profit margin very dependent on the skill and attentiveness of operators of this activity.

The ability to produce reconstituted rawhide that rolls off a conveyor belt with a predetermined thickness and width that can then be cut by machine to the desired length represents a drastic improvement over known methods of producing rawhide pet chews.

The novel method of the present invention overcomes disadvantages which inhere in the known methods of fabricating rawhide pet chews, including the following:

a) Different defibering methods are integrated to improve the yield and evenness of the collagen fiber. Chemical separation begins with acid material applied to swell the de-fibered rawhide mixture, which improves the smoothness among the collagen fibers and makes defibering easier. Mechanical separation occurs with chopping and grinding the raw material to further separate the collagen fibers. Finally the solution is pulverized using a high speed mixing apparatus to separate the originally bonded collagen fibers.

b) Particles are removed from the collagen fiber solution by means of vacuum filtration to improve the evenness and appearance of the collagen fiber reconstituted rawhide.

c) The collagen fibers are chemically dehydrated to contract the expansive state of the fibers and facilitate quick draining and expelling of water, which can greatly improve the drying speed and produce a relatively thicker collagen fiber reconstituted rawhide and reduce the drying costs. According to known methods, drying collagen fiber rawhide with fibers in an expansive state after being extruded or formed using injection molding, requires that all moisture be removed by drying after the pet chew is formed. This is time consuming, high in cost and not practical for thick rawhide products.

d) The cross-linking treatment is applied only after the collagen fiber reconstituted rawhide is shaped and dried, which provides the reconstituted rawhide with a smooth finish and prevents swelling and flaking of the product in water. Moreover, bleaching can be applied to the collagen fiber reconstituted rawhide without altering the finish. The reconstituted product may be soaked and knotted to produce high-end knotted bone products. Products not subjected to cross-linking treatment will swell and become soft if soaked in water, rendering the product inappropriate for knotting and severe bleaching treatment. If a cross-linking agent is applied to the collagen fiber solution before drying, the adhesive forces between the collagen fibers will be poor and the reconstituted rawhide surface will be flaky and rough.

Although the invention is being described with reference to specific embodiments, steps, processes, structures and configurations, these descriptions are not meant to be construed in a limiting sense. Various modifications of the disclosed embodiments, as well as alternative embodiments of the invention will become apparent to persons skilled in the art upon the reference to the description of the invention, all such modifications and alternative embodiments being within the scope and intent of the present invention. So, for example, in the case of embodiments with no specific conditions provided, normal conditions or conditions recommended by the manufacturers should prevail. Reagents and instruments with no manufacturers indicated are normal products that can be sourced from the general markets.

Detailed preferred embodiments one through five are described below with reference to the flowcharts depicted in FIG. 1. Unless otherwise specifically indicated, percentages are percentages by weight.

First Detailed Preferred Embodiment: for the Production of Collagen Fiber Reconstituted Rawhide Using Raw Stock (Animal Skins with Hair)

Prepare 100 kg animal skins with hair or trimming leftovers as the basic beginning material for use in the following process:

1. Soaking and degreasing: Add the 100 kg animal skins to a solution of 3 times water by weight (in this example 300 liters) and 1-3% degreasing agent. Wash for 10 to 24 hours, then drain and flush.
2. Depilation and liming: Add the skins to solution of 1 times water by weight and 1-3% sodium sulfide. React for 30 minutes. Add 2-5% lime and react for 1 hour. Add 2 times water by weight and react for 15-20 hours. Drain and flush.
3. Washing: Add 3 times water by weight and wash for 15 minutes. Drain the rawhide and repeat wash two times using the same method, and drain excess water;
4. Deliming and bating: Add the skins to a solution of 1 time water by weight, 2-3% ammonium sulfate, 1-3% degreasing agent, and 0.1-0.3% pancreatin, and react for 1-3 hours. Drain the excess water.
5. Washing: Add 3 times water by weight and wash for 15 minutes. Drain the excess water;
6. Chopping: Cut the rawhide into cubes smaller than 3×3 cm. Grind the cubed rawhide pieces with a meat chopper.
7. Acid swelling: Add to a solution of 3 times water by weight with 2-4% formic acid, to adjust the pH value of the solution to less than 3. React for 0.5-2 hours. Drain.
8. Defibering and mechanical separation: Pulverize the acid swollen rawhide; add 5 times water by weight and place into the mechanical separator or emulsifier such as a blender. Emulsify for 1-3 minutes using a rotation rate of over 1000 revolutions per minute.
9. Filtration: Filter out the un-dissolved particles having a diameter of greater than 1 mm by means of vacuum filtration.
10. Dehydration: Introduce sodium sulfate and sodium hydroxide into the filtrate to make the salt concentration higher than 5% by weight with a pH value of 6.2-6.4, contracting the expansive state of the collagen fiber and dehydrating the fibers. React for more than 30 minutes.
11. Water extraction using a screen form and mechanical pressure: Lay the collagen fiber slurry after dehydration flat on a form fabricated from screen material to drain the water. The thickness of the reconstituted rawhide may be determined at this step by controlling the amount of solution per unit area of screen. Next, press material to further dry.
12. Drying and cross-linking: Dry the formed fibrous sheet and then dip the fibers into a 2% formaldehyde solution for 1 hour. Dry again to produce the collagen fiber reconstituted rawhide final product.

Second Detailed Preferred Embodiment: for the Production of Collagen Fiber Bonded Rawhide from Remanufactured Materials (Depilated Limed Animal Hide)

Prepare 100 kg depilated limed animal hide or leftovers as the basic beginning material for use in the following process: Prepare collagen fiber reconstituted rawhide according to process steps 3 through 12 described for the first detailed preferred embodiment above. Steps 1 and 2 of the preferred embodiment for the production of collagen fiber reconstituted rawhide using raw stock may be omitted when working with depilated limed animal hide or depilated limed hide leftovers.

Third Detailed Preferred Embodiment: for the Production of Bleached Collagen Fiber Reconstituted Rawhide from Manufactured Rejects (Remnants from Natural Rawhide and Defective Chews and Rawhide Scraps)

Prepare 100 kg manufactured rejects as the basic beginning material for use in the following process:

1. Soaking: Add 5 times water by weight and wash for 1 hour. Drain the excess water.
2. Prepare collagen fiber reconstituted rawhide according to process steps 6 through 12 described for the first detailed embodiment above.
3. Bleaching: Soak the dried collagen reconstituted rawhide in a 5% hydrogen peroxide solution for 30 to 60 minutes. Remove the rawhide and dry to produce collagen fiber reconstituted rawhide exhibiting a bleached or white appearance.

Fourth Detailed Preferred Embodiment: for the Production of Nutritionally Enhanced Collagen Fiber Reconstituted Rawhide Made from Depilated Lime Animal Hides or Other Starting Materials Prepare 100 kg depilated lime animal hides or trimming leftovers as the basic beginning material for use in the following process:

1. Prepare collagen fiber reconstituted rawhide according to steps 3 through 10 described for the first detailed preferred embodiment above.
2. Mixing: Mix into the collagen fiber slurry a measure of chicken fiber at a ratio of 7:3 by weight.
3. Water extraction using a screen form and mechanical pressure: Lay the collagen fiber slurry after dehydration flat on a form fabricated from screen material to drain the water. Next apply mechanical pressure to material (such as between rollers).
4. Drying and cross-linking: Dry the formed fibrous sheets and then dip into a 2% formaldehyde solution for 1 hour. Dry again to produce collagen fiber reconstituted rawhide with enhanced nutritional value.

Fifth Detailed Preferred Embodiment: for the Production of Pet Goods from Collagen Fiber Reconstituted Rawhide Cut the collagen fiber reconstituted rawhide prepared according to any of the processes described above for the first four detailed preferred embodiments into squares of 20×10 cm. Soak and soften the cut rawhide in clean water. Remove from the water and roll. Knot both ends of the rolls and dry to obtain bone-shaped knotted pet chews.

The foregoing description and accompanying illustrations of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

The invention claimed is:

1. A method for preparing reconstituted rawhide from collagen rich pretreated animal hide material comprising:
   a. expanding collagen fibers comprising said pretreated hide material by the addition of acid;
   b. grinding said acid treated hide material into a suspension of fibers comprising charged collagen chains;
   c. chemically drying said suspension into reconstituted rawhide by contracting the swollen state of the collagen fibers within said suspension through the application of a dehydration agent that neutralizes the charges on the collagen chains rendering them insoluble.

2. The method of claim 1 further comprising removing by means of vacuum filtering fibers of a given size following the grinding of the acid treated hide material into a suspension of fibers.

3. The method of claim 1 further comprising bleaching the reconstituted rawhide.

4. The method of claim 1 wherein said formed reconstituted rawhide is dried into sheets and then further shaped by twisting or knotting.

5. The method of claim 1 wherein the acid added to swell said collagen fibers is formic acid added sufficient to adjust the pH of said pretreated hide material to a value of 5 or less.

6. The method of claim 1 wherein the dehydration agent that contracts the collagen fibers in the hide material is a chemical agent that neutralizes the charged carboxyl groups on the collagen fibers facilitating the release of water molecules from the collagen fibers.

7. The method of claim 1 wherein the dehydration agent that contracts the collagen fibers in the hide material is a neutral salt.

8. The method of claim 1 wherein the dehydration agent that contracts the swollen state of the collagen fibers in the hide material is an alkaline material.

9. The method of claim 1 or claim 1 further comprising adding edible material having nutritional value prior to drying said suspension.

10. The method of claim 1 or claim 8 further comprising adding palatability enhancers prior to drying said suspension.

11. A method for preparing reconstituted rawhide from collagen rich pretreated animal hide material comprising:
   a. expanding collagen fibers comprising said pretreated hide material by the addition of acid;
   b. grinding said acid treated hide material into a suspension of fibers comprising charged collagen chains;
   c. chemically drying said suspension into reconstituted rawhide by contracting the swollen state of the collagen fibers within said suspension through the application of a dehydration agent that neutralizes the charges on the collagen chains rendering them insoluble;
   d. applying a cross-linking agent to the reconstituted rawhide to further strengthen the adhesive strength of the reconstituted rawhide material.

12. The method of claim 11 wherein the cross-linking agent is an aldehyde.

13. The method of claim 1 or claim 8 wherein the beginning material for the pretreated hide material is selected from a group comprising animal skins with hair, depilated limed splits, and cutting leftovers of processed pet chews.

14. The method of claim 1 or claim 8 wherein the pretreated hide material is depilated lime splits that are prepared by degreasing, de-liming, washing and mincing or grinding.

15. The method of claim 1 or claim 8 wherein the pretreated hide material is cutting leftovers from processed pet chews that are prepared by soaking and mincing or grinding.

16. The method of claim 1 or claim 8 wherein said formed reconstituted rawhide is further shaped by twisting or knotting.

17. Reconstituted rawhide prepared according to the method of claim 1 or 8.

18. Pet chews made from reconstituted rawhide prepared according to the method claim 1 or 8.

* * * * *